United States Patent
Kim et al.

(10) Patent No.: US 11,637,476 B2
(45) Date of Patent: Apr. 25, 2023

(54) ELASTIC BUSH AND MOTOR USING SAME

(71) Applicant: KEYANG ELECTRIC MACHINERY CO., LTD., Seoul (KR)

(72) Inventors: Hoe Cheon Kim, Ansan-si (KR); Young Cheol Kim, Ansan-si (KR)

(73) Assignee: KEYANG ELECTRIC MACHINERY CO., LTD., Seoul (KR)

( * ) Notice: Subject to any disclaimer, the term of this patent is extended or adjusted under 35 U.S.C. 154(b) by 268 days.

(21) Appl. No.: 16/943,607

(22) Filed: Jul. 30, 2020

(65) Prior Publication Data
US 2021/0057961 A1  Feb. 25, 2021

(30) Foreign Application Priority Data

Aug. 19, 2019 (KR) .................. 10-2019-0101398

(51) Int. Cl.
| | |
|---|---|
| *H02K 5/24* | (2006.01) |
| *H02K 5/167* | (2006.01) |
| *H02K 7/08* | (2006.01) |
| *F16F 1/373* | (2006.01) |

(52) U.S. Cl.
CPC ............. *H02K 5/24* (2013.01); *F16F 1/3732* (2013.01); *H02K 5/1672* (2013.01); *H02K 7/083* (2013.01); *F16F 2224/02* (2013.01); *F16F 2224/025* (2013.01); *F16F 2224/0208* (2013.01)

(58) Field of Classification Search
CPC ........ H02K 5/16; H02K 5/161; H02K 5/1672; H02K 5/167; H02K 5/173; H02K 5/1732; H02K 5/24; H02K 7/08; H02K 7/083; H02K 2205/03; F16F 1/373; F16F 1/3732; F16F 1/3735; F16C 2380/26; F16C 25/083
See application file for complete search history.

(56) References Cited

U.S. PATENT DOCUMENTS

2014/0103764 A1   4/2014   Suarez-Seminario

FOREIGN PATENT DOCUMENTS

| GB | 2054759 A | * | 2/1981 | ......... B29C 45/4407 |
|---|---|---|---|---|
| JP | 2004-120850 A | | 4/2004 | |
| JP | 2008-511278 A | | 4/2008 | |
| KR | 200338384 Y1 | * | 1/2004 | |
| KR | 10-2008-0077133 A | | 8/2008 | |
| KR | 10-1226134 B1 | | 1/2013 | |

* cited by examiner

*Primary Examiner* — Eric Johnson
(74) *Attorney, Agent, or Firm* — Novick, Kim & Lee PLLC; Jae Youn Kim (57) ABSTRACT

An elastic bush and an electric motor using the elastic bush are proposed. The elastic bush includes a bush body having in a central portion thereof a coupling hole into which a rotating shaft is inserted, a circular separation plate spaced apart from an end of the bush body in an extending direction of the rotating shaft and coming into close contact with a neighboring associated component, and a plurality of connecting legs each connected at both ends thereof to the bush body and the separation plate, and elastically deformed to vary a relative distance between the bush body and the separation plate. An entire length of the elastic bush is varied through elastic deformation. Therefore, a gap between two components located on both sides of the elastic bush, such as a front bush and an armature assembly, may be more effectively reduced.

10 Claims, 5 Drawing Sheets

ELASTIC BUSH AND MOTOR USING SAME

CROSS REFERENCE TO RELATED APPLICATION

The present application claims priority to Korean Patent Application No. 10-2019-0101398, filed Aug. 19, 2019, the entire contents of which are incorporated herein for all purposes by this reference.

BACKGROUND OF THE INVENTION

Field of the Invention

The present invention relates to an electric motor. More particularly, the invention relates to an elastic bush installed in a motor to reduce a gap between components with elastic force, and an electric motor using the elastic bush.

Description of the Related Art

Generally, motors may be classified into a brush motor and a brushless motor (BLDC motor). Out of these motors, the brush motor is widely used, and is employed in various industrial environments because the brush motor is relatively more inexpensive than the brushless motor.

A brush-type permanent magnet motor includes a yoke assembly configured such that a permanent magnet is disposed in a yoke, and an armature assembly configured such that an armature coil is wound on a core of a rotating shaft and a commutator is press-fitted into a front end thereof. The armature assembly that is a rotor is disposed in the permanent magnet of the yoke assembly that is the stator while maintaining a gap. Thereafter, if current flows in the armature coil, an electromagnetic force is generated between the armature coil and the permanent magnet, so that the armature assembly is rotated according to the Fleming's left-hand law to obtain power.

A bush is fitted over the rotating shaft of the motor. The bush eliminates a gap between the rotating shaft and a periphery, thus allowing the rotating shaft to be stably rotated without shaking. The bush may be a metal material or a synthetic resin material, and two or more bushes may be simultaneously used in some cases.

Such a bush may reduce the circumferential gap of the rotating shaft, namely, a gap between the rotating shaft and the periphery. However, the bush is problematic in that it is difficult to reduce the axial gap. The bush should be designed and manufactured to have a correct thickness, because the gap between components is not completely eliminated, if an error occurs. Even if the bush is made of the synthetic resin material instead of the metal material, the amount of elastic deformation is not large, so that there is a limit in reducing the gap.

As such, unless the bush reduces the axial gap of the rotating shaft, noise is generated while the rotating shaft is rotated. For example, during the rotation of the rotating shaft, the armature assembly may strike the bush, thus generating noise. Furthermore, if the gap causes larger friction to occur between the components, the durability of the components is deteriorated.

DOCUMENTS OF RELATED ART (Patent Document 1) KR Patent Application Publication No. 10-2008-0077133
(Patent Document 2) JP Patent Application Publication No. 2004-120850

SUMMARY OF THE INVENTION

The present invention has been made in order to solve the above-mentioned problems in the related art and an objective of the present invention is to reduce a gap between components and noise caused by the gap, using an elastic bush having elastic force.

In order to achieve the objective of the present invention, the present invention provides an elastic bush, including a bush body having in a central portion thereof a coupling hole into which a rotating shaft is inserted; a circular separation plate spaced apart from an end of the bush body in an extending direction of the rotating shaft, and coming into close contact with a neighboring associated component; and a plurality of connecting legs each connected at both ends thereof to the bush body and the separation plate, and elastically deformed to vary a relative distance between the bush body and the separation plate.

The connecting leg may include a body connecting portion extending away from a side of the bush body, and an extending portion connected at a first end thereof to the body connecting portion, and connected at a second end thereof to a bottom of the separation plate.

The body connecting portion may have a smaller sectional area than the extending portion.

The body connecting portion may extend obliquely with reference to a radial direction of the bush body.

An inner diameter of a passing hole formed in a central portion of the separation plate may be larger than an outer diameter of the bush body.

The separation plate may have a shape of a disc configured such that an outer surface thereof facing the associated component is a plane and the passing hole is formed in a central portion thereof so that the rotating shaft passes therethrough.

According to another aspect of the invention, an electric motor using an elastic bush may include a yoke assembly generating a magnetic field; an armature assembly configured such that a coil is wound on a core slot formed in a core, and disposed in the yoke assembly to rotate about a rotating shaft; a front bush coupled to a side of the rotating shaft to reduce a gap with a peripheral component; and the elastic bush fitted over the rotating shaft, located between the armature assembly and the front bush to prevent a gap between the front bush and the armature assembly, wherein the elastic bush may include a bush body and a separation plate spaced apart from each other and connected to each other via a connecting leg, a relative distance between the bush body and the separation plate varying as the connecting leg is elastically deformed.

An elastic bush and an electric motor using the elastic bush according to the present invention have the following effects.

In the present invention, an entire length of the elastic bush is varied through elastic deformation. Therefore, a gap between two components located on both sides of the elastic bush, such as a front bush and an armature assembly, may be more effectively reduced, thus preventing noise and abrasion in the process of operating the motor.

Moreover, in the present invention, the elastic bush is provided with a connecting leg that connects a bush body and a separation plate. A variable amount of a length of the elastic bush is increased through the elastic deformation of the connecting leg. As a total variable amount of the length of the elastic bush is sufficiently secured, it is possible to reduce a larger gap formed in the motor. Thus, the same elastic bush may be employed regardless of the specification of the motor or the size of the gap, and the usability and compatibility of the elastic bush are improved.

Particularly, if the total variable amount of the length of the elastic bush increases, the elastic force of the elastic bush increases, and thereby vibration and shock absorbed by the elastic bush also increase. As a result, the elastic bush according to the present invention is advantageous in that it is possible to more effectively reduce noise that is generated in the process of operating the motor.

Furthermore, in the present invention, the separation plate constituting the elastic bush has a disc structure, so that a sufficient contact area is secured between the separation plate and a component that is in close contact therewith, such as the front bush, thus ensuring stable contact, and the bush body may be located in a passing hole formed in the separation plate in the process of elastic deformation, thus securing a sufficiently large variable amount.

BRIEF DESCRIPTION OF THE DRAWINGS

The above and other objectives, features, and other advantages of the present invention will be more clearly understood from the following detailed description when taken in conjoint with the accompanying drawings, in which.

DETAILED DESCRIPTION OF THE INVENTION

Hereinafter, embodiments of the present invention will be described in detail with reference to the accompanying drawings. It should be noted that the same reference numerals shown in the drawings will denote the same components. Furthermore, in the description of the present invention, if it is determined that the detailed description of the related art unnecessarily makes the gist of the present invention obscure, its detailed description will be omitted.

Terms such as "first", "second", "A", "B", "(a)", and "(b)" may be used to describe various components. These terms are only used for the purpose of differentiating a component from other components, but do not limit the nature, order, or sequence of components. It is also noted that in this specification, "connected/coupled" refers to one component not only directly coupling another component but also indirectly coupling another component through an intermediate component.

The present invention is directed to an elastic bush 60 and an electric motor using the elastic bush (hereinafter referred to as the 'electric motor'). The electric motor is used to generate driving force and thereby operate various devices. For example, the electric motor of the present invention may be used to automatically move a seat of a vehicle forwards or backwards. To this end, the electric motor of the present invention requires a component that is supplied with power from a battery (not shown), for example, a brush card assembly. However, since the brush card assembly is not a key component of the present invention, description thereof is omitted herein. Hereinafter, an armature assembly 40 and a yoke assembly 10 constituting the electric motor of the present invention will be described.

Figure 1:
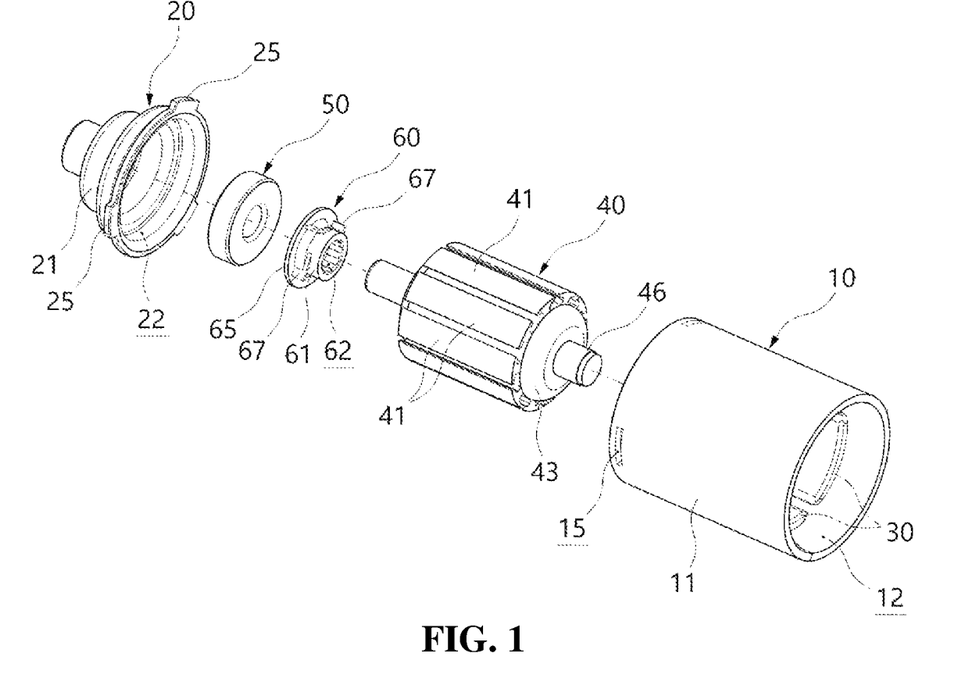
FIG. 1 is an exploded perspective view showing components of an electric motor using an elastic bush according to an embodiment of the present invention.

FIG. 1 separately illustrates the yoke assembly 10 and an armature assembly 40 of the electric motor according to the present invention. The yoke assembly 10 and the armature assembly 40 rotate relative to each other. More precisely, the armature assembly 40 accommodated in the fixed yoke assembly 10 rotates relative to the yoke assembly 10. To this end, the armature assembly 40 is supplied with power from an external device, and then converts the power from electric energy into rotational energy.

The yoke assembly 10 is configured such that a cylindrical yoke 11 forms an external frame of the yoke assembly 10. The yoke 11 may be inserted into a separate motor housing (not shown), and a gear assembly may be coupled to a side of the motor housing. Furthermore, a brush card assembly is further mounted on the yoke 11, which is not shown in the drawings.

A rotational space 12 is defined in the yoke 11, and a fixed magnet 30 is provided on an inner circumference of the rotational space 12. The fixed magnet 30 provides a magnetic force for rotating the armature assembly 40 that will be described below. That is, the yoke assembly 10 generates a magnetic field. A plurality of fixed magnets 30 is provided on the inner circumference of the rotational space 12 to be spaced apart from each other. Reference numeral 15 denotes an assembly hole used to assemble the yoke 11 with a cover 20.

The cover 20 is assembled with the yoke assembly 10. The cover 20 is assembled with the yoke assembly 10 to define an assembly space therebetween. More precisely, an internal space 22 of the cover 20 and the rotational space 12 of the yoke 11 are coupled to each other to form one assembly space. The cover 20 is coupled to a front of the yoke assembly 10. An assembly protrusion 25 provided on the cover 20 is fitted into the assembly hole 15 of the yoke 11 to assemble the cover with the yoke. A cover body 21 forming a frame of the cover 20 may have a stepped structure, as shown in the drawings.

The armature assembly 40 is inserted into the assembly space defined by the yoke assembly 10 and the cover 20. The armature assembly 40 is supplied with power from the external device, and then converts the electric energy into the rotational energy. Thereby, the armature assembly 40 may rotate relative to the yoke 11. If the armature assembly 40 rotates, a rotating shaft 46 located along a central axis thereof rotates together to transmit a rotating force to the gear assembly or the like. Since the rotating shaft 46 is installed along the central axis of the armature assembly 40, the rotating shaft 46 may serve as a center of rotation. The frame of the armature assembly 40 is formed by a core 41.

The core 41 may have the shape of a cylinder that surrounds the rotating shaft 46 installed at the center.

Figure 2:
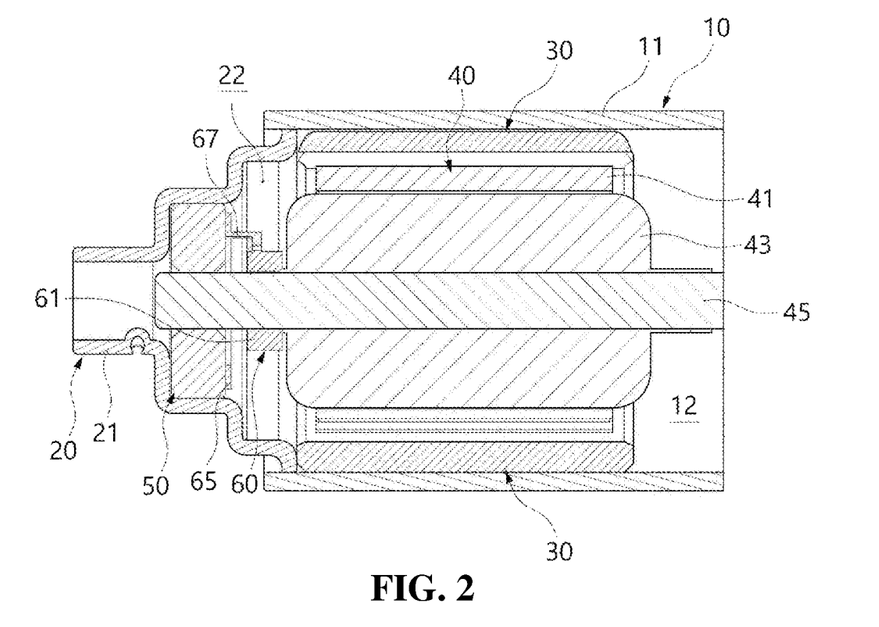
FIG. 2 is a sectional view showing an internal structure of the electric motor of FIG. 1 when it being assembled.
Figure 3:
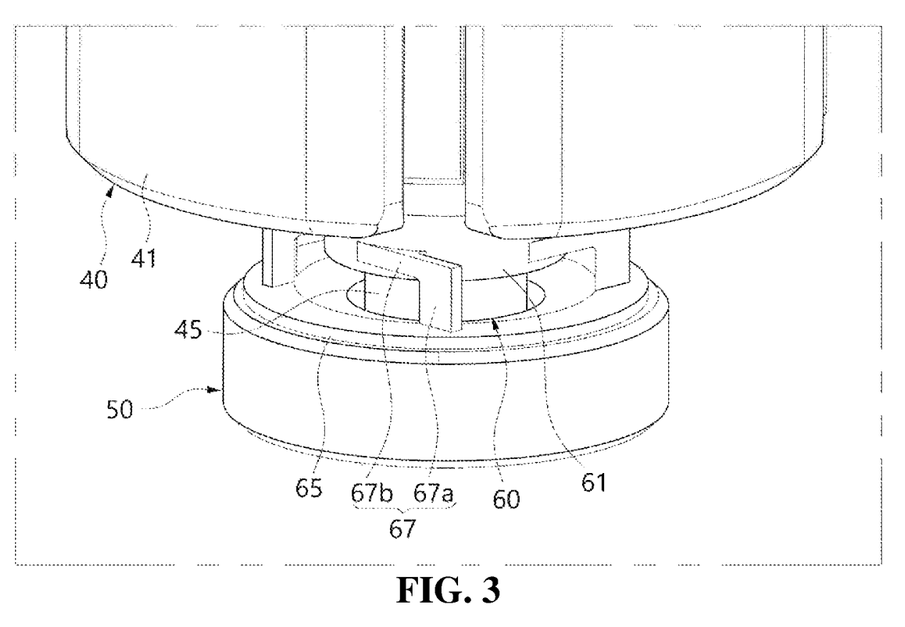
FIG. 3 is a perspective view showing a state in which the elastic bush according to the embodiment of FIG. 1 is coupled between a front bush and an armature core.

The core 41 is made by stacking a plurality of core plates. Each core plate is formed of a thin metallic steel plate. By stacking the core plates having the same shape, a three-dimensional shape is obtained as shown in FIG. 2. A coil 43 (enameled copper wire) is wound on the core 41. The coil 43 forms the armature assembly 40 by repeatedly winding a winding leg (not labeled) radially extending from the core 41.

A front bush 50 is fitted over the rotating shaft 46. The front bush 50 is fitted over a front portion of the rotating shaft 46, and has a cylindrical shape as shown in FIG. 1. The front bush 50 fills an empty space between the front portion of the rotating shaft 46 and a periphery surrounding the rotating shaft 46. Thereby, this makes it possible to rotate the rotating shaft 46 without a gap. In this embodiment, the front bush 50 is made of a metal material, but the present invention is not limited thereto. For example, the front bush 50 may be made of various materials such as synthetic resin, urethane, or rubber.

An elastic bush 60 is fitted over the rotating shaft 46. The elastic bush 60 is located between the front bush 50 and the yoke assembly 10. Similarly to the front bush 50, the elastic bush 60 fills the empty space between the front portion of the rotating shaft 46 and the periphery surrounding the rotating shaft 46. In addition, the elastic bush 60 may function to prevent an axial gap of the rotating shaft 46, namely, a gap between the front bush 50 and the armature assembly 40. This function is attributable to the elastic force of the elastic bush 60. The elastic bush 60 may be elastically deformed in terms of its material as well as its structure. The structure will be described below in detail.

Figure 4:
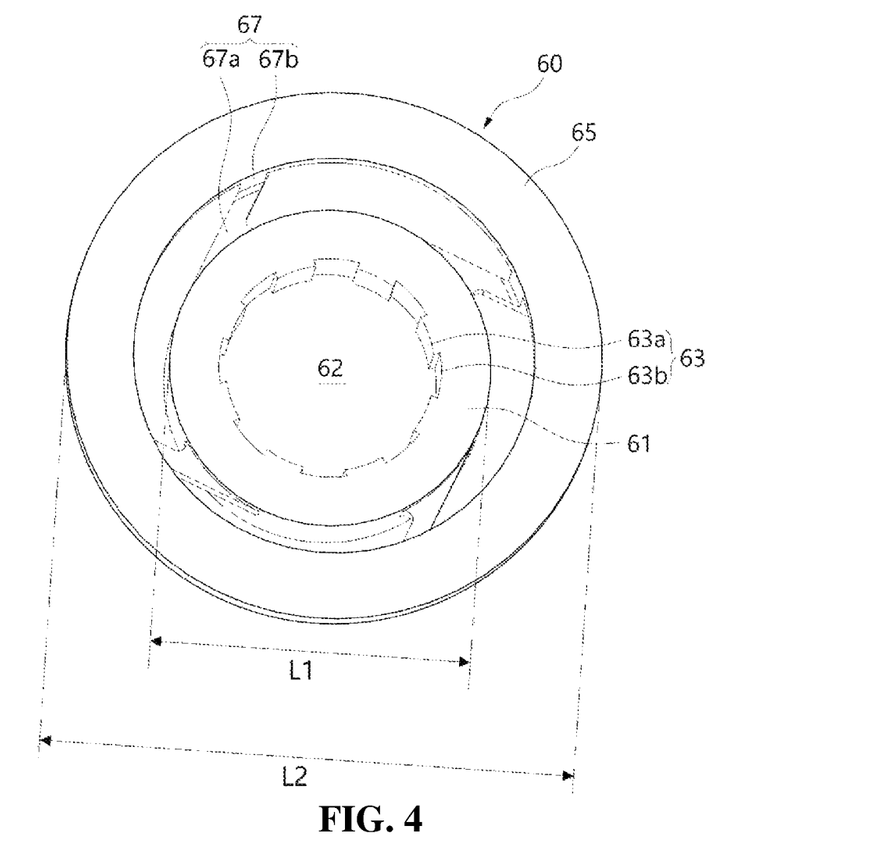
FIG. 4 is a perspective view showing the configuration of the elastic bush according to the embodiment of the present invention.
Figure 5:
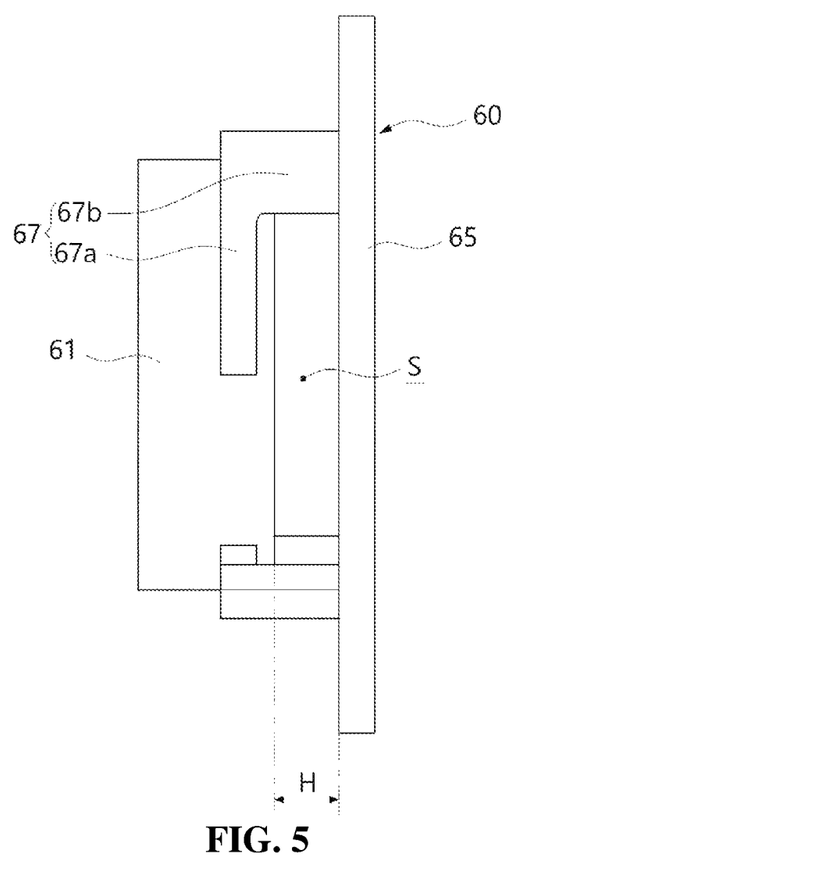
FIG. 5 is a side view showing a side configuration of the elastic bush of FIG. 4.

The elastic bush 60 is mainly composed of a bush body 61 and a separation plate 65. The bush body 61 is a portion that is fixedly fitted over the rotating shaft 46 and has a cylindrical shape as shown in FIGS. 1 and 4. The separation plate 65 has a shape of a disc that is spaced apart from the bush body 61 in a longitudinal direction of the rotating shaft 46. If an external compressive force acts on the elastic bush, the bush body 61 and the separation plate 65 are pressed to approach each other while elastic deformation occurs. In this case, the axial gap of the motor is reduced.

In this embodiment, the bush body 61 is fitted over the rotating shaft 46 such that one end of the bush body comes into close contact with the armature assembly 40, and the separation plate 65 comes into close contact with the front bush 50. Moreover, the bush body and the separation plate are connected to each other via a connecting leg 67. The connecting leg 67 is connected at both ends thereof to the bush body 61 and the separation plate 65. While the connecting leg itself is elastically deformed, a relative distance between the bush body 61 and the separation plate 65 is varied. In this embodiment, the elastic bush 60 has a total of four connecting legs 67.

The structure of the bush body 61 is as follows: a coupling hole 62 is formed in a central portion of the bush body 61 so that the rotating shaft 46 is inserted therein, and an uneven portion 63 is formed on an inner surface of the coupling hole 62. The uneven portion 63 alternately includes protruding portions 63a that protrude inwards from an edge of the coupling hole 62 and concave portions 63b that are depressed in a direction opposite to the protruding portions 63a. The uneven portion 63 allows the rotating shaft 46 to be firmly secured to the interior of the coupling hole 62.

The separation plate 65 separated from the bush body 61 has the shape of a thin disc. An outer surface of the separation plate facing the front bush 50 is formed to be a plane. A passing hole (not labeled) is formed in a central portion of the separation plate 65. As shown in FIG. 4, an inner diameter L2 of the passing hole is larger than an outer diameter L1 of the bush body 61. Thus, while the bush body 61 and the separation plate 65 are compressed, the bush body 61 may be located in the passing hole of the separation plate 65. Of course, the separation plate 65 does not necessarily have a diameter larger than that of the bush body 61. The bush body 61 and the separation plate 65 may have the same size.

The structure of the connecting leg 67 is as follows: the connecting leg 67 is composed of a body connecting portion 67a and an extending portion 67b. The body connecting portion 67a is a portion that is connected to the bush body 61, and extends away from a side of the bush body 61 as shown in FIG. 4. In other words, the body connecting portion 67a protrudes obliquely from the bush body 61 rather than radially. Thereby, the entire length of the body connecting portion 67a increases. If the body connecting portion 67a is lengthened, the amount of elastic deformation likewise increases, so that a gap compensation amount by the elastic bush 60 may increase.

Figure 6:
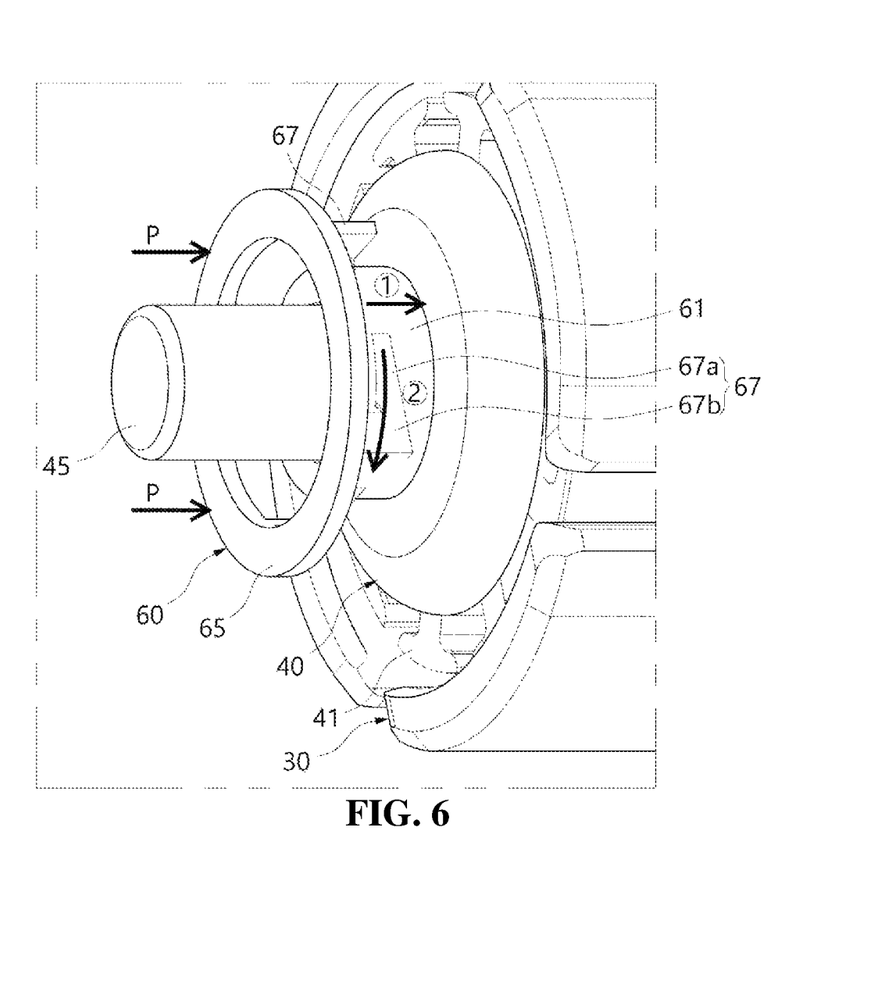
FIG. 6 is a perspective view showing a state in which the elastic bush of FIG. 4 is coupled to the armature core.

Furthermore, since the body connecting portion 67a is obliquely deformed while the bush body 61 and the separation plate 65 are pressed, the separation plate 65 may be rotated relative to the bush body 61 to some degree. Referring to FIG. 6, if an external force P acts in the direction of compressing the elastic bush 60, the separation plate 65 may move towards the bush body 61 (direction of arrow ①), and simultaneously may be rotated at a predetermined angle in a direction (direction of arrow ②) perpendicular thereto as the body connecting portion 67a rotates. Thereby, a relative moving distance between the bush body 61 and the separation plate 65 may be further increased.

The extending portion 67b is connected at one end thereof to the body connecting portion 67a, and connected at the other end to a bottom of the separation plate 65. In this embodiment, the extending portion 67b may extend in a direction in which the rotating shaft 46 is connected. The extending portion 67b may extend to be flared or tapered towards the separation plate 65.

As such, since the connecting leg 67 is composed of the body connecting portion 67a and the extending portion 67b and their extending directions are different from each other, the entire connecting leg 67 may be elastically deformed while being more easily folded between the body connecting portion 67a and the extending portion 67b if the compressive force is applied. Particularly, in this embodiment, the body connecting portion 67a has a smaller sectional area than the extending portion 67b. Thus, a portion in which the body connecting portion 67a and the extending portion 67b meet each other may be more easily folded.

Meanwhile, the elastic bush 60 is made of material that is easily elastically deformed, such as synthetic resin material. Thus, the bush body 61 or the separation plate 65 as well as the connecting leg 67 may be elastically deformed. Consequently, the elastic bush 60 may have a restoring force in various directions, thus allowing the gap in the motor to be reduced.

Next, an operation of the elastic bush in the electric motor using the elastic bush according to the present invention will be described.

If the above-described yoke assembly 10, armature assembly 40, rotating shaft 46, cover 20, front bush 50, and elastic bush 60, the state shown in FIG. 2 is obtained. At this time, since the length of the elastic bush 60 is greater than a distance between the front bush 50 and the yoke assembly 10, an overlap zone occurs. Thus, the elastic bush 60 is elastically deformed to some degree in the longitudinal direction of the rotating shaft 46.

Since the elastic bush 60 is located between the front bush 50 and the yoke assembly 10 while being elastically deformed, the axial gap between the front bush 50 and the yoke assembly 10 may be eliminated. Particularly, since the entire elastic bush 60 is elastically deformable, it is possible to reduce a larger gap and consequently to compensate for gaps caused by a production process as well as an assembly process.

A process in which the elastic bush 60 is elastically deformed is as follows: while the connecting leg 67 of the elastic bush 60 is folded, the bush body 61 and the separation plate 65 come close to each other. At this time, while the portion between the body connecting portion 67a and the extending portion 67b constituting the connecting leg 67 is folded, the entire connecting leg 67 is elastically deformed. Particularly, in this embodiment, the body connecting portion 67a has a smaller sectional area than the extending portion 67b, so that the portion in which the body connecting portion 67a and the extending portion 67b meet each other may be more easily bent.

Simultaneously, as shown in FIG. 6, if the external force P (in this embodiment, compressive force due to overlap) is applied in the direction of compressing the elastic bush 60, the separation plate 65 move towards the bush body 61 (direction of arrow ①), and simultaneously may be rotated at a predetermined angle in the direction (direction of arrow ②) perpendicular thereto as the body connecting portion 67a rotates. Thereby, the relative moving distance between the bush body 61 and the separation plate 65 may be further increased. It is possible to prevent the gap and to absorb shock acting on components during the operation of the motor. This results in a reduction in noise of the motor.

Meanwhile, as for the elastic bush 60 according to the present invention, the bush body 61 or the separation plate 65 as well as the connecting leg 67 may be elastically deformed. Thus, even if a contact surface of the separation plate 65 and the front bush 50 is uneven, the separation plate 65 is elastically deformed, so that the separation plate and the front bush may smoothly come into close contact with each other. The same applies to the bush body 61 and the yoke assembly 10.

Accordingly, it is possible to more effectively prevent noise from being generated during the operation of the motor, in addition to compensating for the gap.

Although all components according to an embodiment of the present invention have been described as being combined or operated in a specific form, the present invention is not limited to this embodiment. In other words, all components may be selectively combined and operated in different forms without departing from the scope of the present invention. Furthermore, "include/comprise" or "including/comprising" used in the specification represents that one or more components, steps, operations, and elements exist or are added, unless otherwise specified. Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Although the present disclosure was described with reference to specific embodiments, it is apparent to those skilled in the art that the present disclosure may be changed and modified in various ways without departing from the spirit or scope of the present disclosure, which is described in the following claims. Therefore, it should be understood that the exemplary embodiments are only for illustrative purposes and do not limit the bounds of the present invention. It is intended that the bounds of the present disclosure are defined by the accompanying claims, and various modifications, additions and substitutions, which can be derived from the meaning, scope and equivalent concepts of the accompanying claims, fall within the bounds of the present disclosure.

What is claimed is:

1. An elastic bush, comprising:
a bush body having in a central portion thereof a coupling hole into which a rotating shaft is inserted;
a circular separation plate spaced apart from an end of the bush body in an extending direction of the rotating shaft, and coming into close contact with a neighboring associated component; and
a plurality of connecting legs each connected at both ends thereof to the bush body and the circular separation plate, and elastically deformed to vary a relative distance between the bush body and the circular separation plate, and
wherein each connecting leg comprises:
a body connecting portion extending away from a radial side of the bush body and extending parallel to the circular separation plate; and
an extending portion connected at a first end thereof to the body connecting portion in a direction perpendicular to the body connecting portion, and connected at a second end thereof to a bottom of the circular separation plate, and
wherein the height of the bush body in the extending direction of the rotating shaft is greater than the distance between the bush body and the circular separation plate.

2. The elastic bush of claim 1, wherein the body connecting portion has a smaller sectional area than the extending portion.

3. The elastic bush of claim 1, wherein the body connecting portion extends obliquely with reference to a radial direction of the bush body.

4. The elastic bush of claim 1, wherein an inner diameter of a passing hole formed in a central portion of the circular separation plate is larger than an outer diameter of the bush body.

5. The elastic bush of claim 1, wherein the circular separation plate has a shape of a disc configured such that an outer surface thereof facing the associated component is a plane and a passing hole is formed in a central portion thereof so that the rotating shaft passes therethrough.

6. An electric motor using an elastic bush, the electric motor comprising:
a yoke assembly generating a magnetic field;
an armature assembly configured such that a coil is wound on a core slot formed in a core, and disposed in the yoke assembly to rotate about a rotating shaft;
a front bush coupled to a side of the rotating shaft to reduce a gap with a peripheral component; and
the elastic bush fitted over the rotating shaft, located between the armature assembly and the front bush to prevent a gap between the front bush and the armature assembly, wherein the elastic bush comprises a bush body and a circular separation plate spaced apart from each other and connected to each other via a connecting leg, a relative distance between the bush body and the circular separation plate varying as the connecting leg is elastically deformed, wherein each connecting leg comprises:

a body connecting portion extending away from a radial side of the bush body and extending parallel to the circular separation plate; and an extending portion connected at a first end thereof to the body connecting portion in a direction perpendicular to the body connecting portion, and connected at a second end thereof to a bottom of the circular separation plate, and wherein the height of the bush body in an extending direction of the rotating shaft is greater than the distance between the bush body and the circulation separation plate.

7. The electric motor of claim 6, wherein the elastic bush further comprises:

the bush body having in a central portion thereof a coupling hole into which the rotating shaft is inserted, and coming into close contact with the armature assembly;

the circular separation plate spaced apart from an end of the bush body in an extending direction of the rotating shaft, and coming into close contact with the neighboring front bush; and the plurality of connecting legs each connected at both ends thereof to the bush body and the circular separation plate, and elastically deformed to vary a relative distance between the bush body and the circular separation plate.

8. The electric motor of claim 7, wherein the body connecting portion extends obliquely with reference to a radial direction of the bush body.

9. The electric motor of claim 6, wherein an inner diameter of a passing hole formed in a central portion of the circular separation plate is larger than an outer diameter of the bush body.

10. The electric motor of claim 6, wherein the circular separation plate has a shape of a disc configured such that an outer surface thereof facing the front bush is a plane and a passing hole is formed in a central portion thereof so that the rotating shaft passes therethrough.

* * * * *